July 1, 1969  T. L. OBERLE ET AL  3,452,914
APPARATUS FOR CONTROLLING FLASH DURING FRICTION BONDING
Original Filed July 9, 1962

INVENTORS.
THEODORE L. OBERLE
MARION R. CALTON
CALVIN D. LOYD
CLAUDE F. WHITE
BY
ATTORNEYS

United States Patent Office 3,452,914
Patented July 1, 1969

3,452,914
APPARATUS FOR CONTROLLING FLASH
DURING FRICTION BONDING
Theodore L. Oberle, Washington, Marion R. Calton, East Peoria, Calvin D. Loyd, Peoria, and Claude F. White, Creve Coeur, Ill., assignors to Caterpillar Tractor Co., Peoria, Ill., a corporation of California
Original application July 9, 1962, Ser. No. 212,178, now abandoned. Divided and this application Apr. 11, 1966, Ser. No. 541,791
Int. Cl. B23k 27/00, 5/22, 9/02
U.S. Cl. 228—2      5 Claims

ABSTRACT OF THE DISCLOSURE

Friction welding apparatus for producing a smooth bond between two tubular weld pieces comprising fixture means for securing each of the weld pieces and moving them in relative rotation, a ceramic sleeve secured to one of the fixtures and extending sufficiently past the interface of the weld pieces with an inside diameter just greater than the outside diameter of the weld pieces to permit relative rotation of one of the weld pieces and a ceramic plug simliarly arranged within the internal passage of the two weld pieces and extending across their interface, the sleeve and plug to smooth and deflect flash developed at the interface of the weld pieces during the bonding process.

Figure 1:
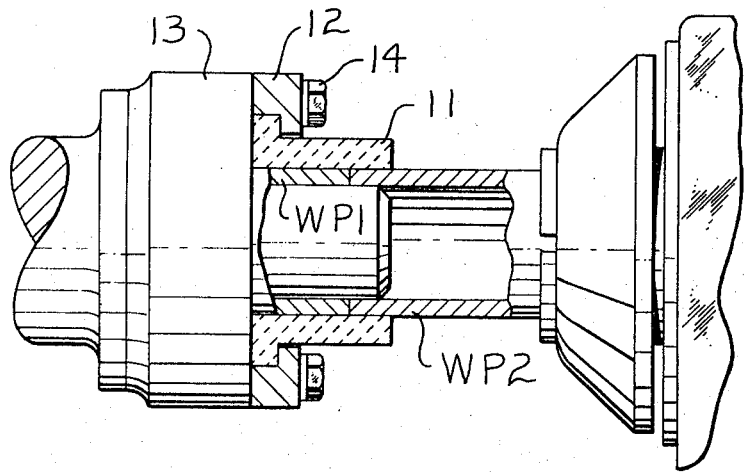

This application is a division of U.S. application Ser. No. 212,178, filed July 9, 1962, now abandoned, and U.S. application Ser. No. 407,955, filed Oct. 27, 1964, now U.S. Patent No. 3,273,233. U.S. application Ser. No. 407,955 is a continuation-in-part of U.S. application Ser. No. 212,178.

This application relates to a friction bonding process in which adjoining ends of the two parts to be joined are engaged in rotational rubbing contact under pressure until the interface is heated to a plastic condition and flash is squeezed from the interface. This application relates particularly to method and apparatus for smoothing the flash.

The flash produced by the friction bonding or welding process noted generally above, and described in greater detail in the above-noted U.S. application Ser. No. 212,-178 is usually machined off of the completed product after the parts have been joined. In many cases, because of the construction, function or appearance of the product, the flash may be undesirable or unacceptable.

It is therefore a primary object of the present invention to smooth and to deflect the flash from areas where the flash is not wanted or cannot be accepted.

In one form of the present invention a reusable ceramic sleeve and ceramic plug are used to smooth the respective outer and inner flash of two tubular parts.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

Figure 2:
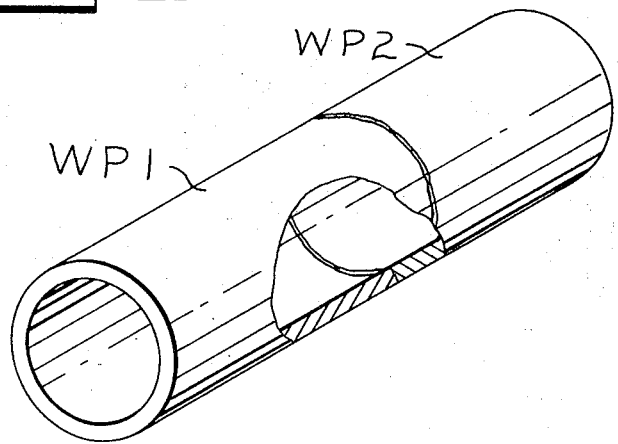

In the drawings:

FIG. 1 is a fragmentary elevation view, partly broken away in section, illustrating the use of a ceramic collar and ceramic insert plug for smoothing flash formed during the bonding operation; and FIG. 2 is an isometric view of a product produced by the use of a ceramic collar and insert plug as illustrated in FIG. 1.

In FIG. 1 one form of apparatus is illustrated for smoothing the flash at the time that it is formed to avoid the necessity for subsequent machining. A ceramic sleeve 11 is clamped in place by a collar 12 which is in turn mounted on a chuck 13 by capscrews 14. A ceramic plug 16 is also retained in the position illustrated to smooth the inner flash formed when the workpieces WP1 and WP2 are bonded together. In actual practice the use of ceramic plugs and sleeves in this manner virtually eliminates the inner and outer flash. The ceramic sleeve and plug, which may be made of $AL_2O_3$, can be reused after the bonding operation.

FIG. 2 illustrates the manner in which the inner and outer flash is smoothed by the use of a sleeve and plug as illustrated in FIG. 1.

The use of above described flash smoothing apparatus is particularly effective when the parts are joined by the inertia bonding process since the parameters of the inertia bonding process can easily be controlled to produce a good bond with a small amount of flash.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. Friction welding apparatus for bonding two cylindrical weld pieces of generally equal diameters by engaging the parts in rotational rubbing contact at a common interface under sufficient pressure to heat the interface to a plastic condition and to squeeze plastic material out of the interface, comprising
    fixture means for securing each weld piece,
    means associated with said fixture means for driving the weld pieces in relative rotation,
    means associated with said fixture means for applying axial pressure between the weld pieces, and
    a cylindrical restraining sleeve disposed between the fixtures to snugly surround the weld pieces at their interface, said sleeve having a generally constant inside diameter at least adjacent the interface, the inside diameter of the sleeve being slightly larger than the diameters of the weld pieces to permit relative rotation of at least one of the weld pieces and extending sufficiently far in both directions from the interface to smooth and deflect all of the external flash squeezed out of the interface and to form a smooth joint between the weld pieces.

2. Apparatus as defined in claim 1 wherein the sleeve is a ceramic sleeve.

3. Apparatus as defined in claim 1 wherein the two weld pieces are tubular and define a passageway across their interface upon alignment for welding and further comprising a cylindrical plug for arrangement between the fixture means to snugly fit in the passageway at the interface of the weld pieces and permit relative rotation of at least one of the weld pieces, said plug extending sufficiently along the axis of the passageway in both directions from the interface to smooth and deflect all of the flash which would otherwise project into the passageway.

4. Apparatus as defined in claim 1 further comprising means associated with said drive means and one of said fixture means for establishing inertia welding parameters during the bonding of the weld pieces to produce a satisfactory bond with a small amount of flash.

5. Apparatus as defined in claim 4 wherein the inertia welding means comprise an inertial mass by which energy is solely developed at the interface during the bonding of the weld pieces and the sleeve is secured to the other fixture means.

References Cited

UNITED STATES PATENTS

| | | | |
|---|---|---|---|
| 402,107 | 4/1889 | Ries | 219—60 X |
| 1,990,077 | 2/1935 | Kershaw | 29—491 |
| 2,796,843 | 6/1957 | Kleppinger | 29—491 X |
| 3,235,162 | 2/1966 | Hollander | 29—470.3 |

JOHN F. CAMPBELL, *Primary Examiner.*

B. L. ADAMS, *Assistant Examiner.*

U.S. Cl. X.R.

29—470.3, 491; 228—50